May 5, 1931.    F. W. PARKER    1,804,109
SAFETY GEAR SHIFT
Filed Sept. 22, 1930    2 Sheets-Sheet 2
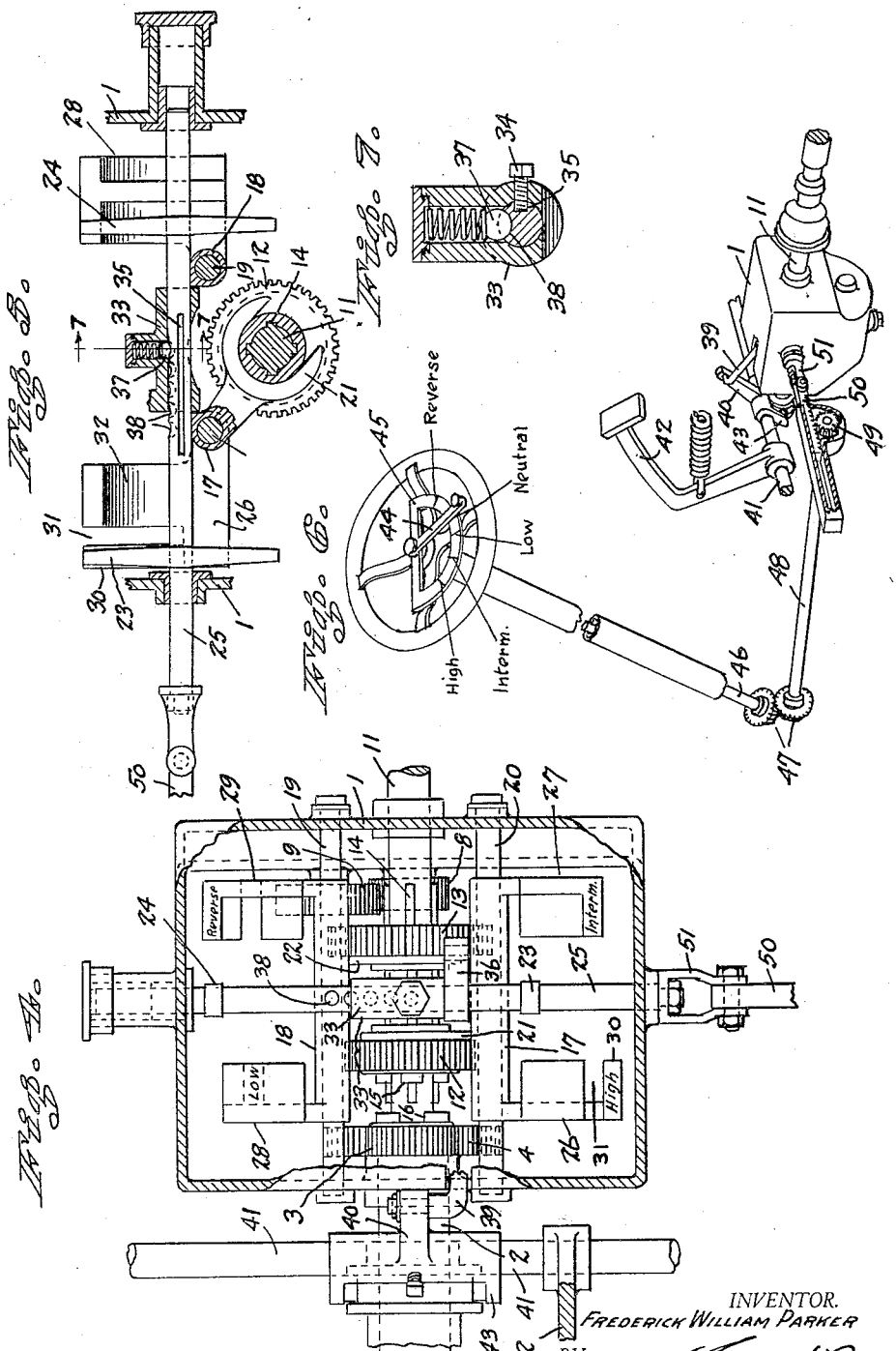
INVENTOR.
FREDERICK WILLIAM PARKER
BY
ATTORNEYS.

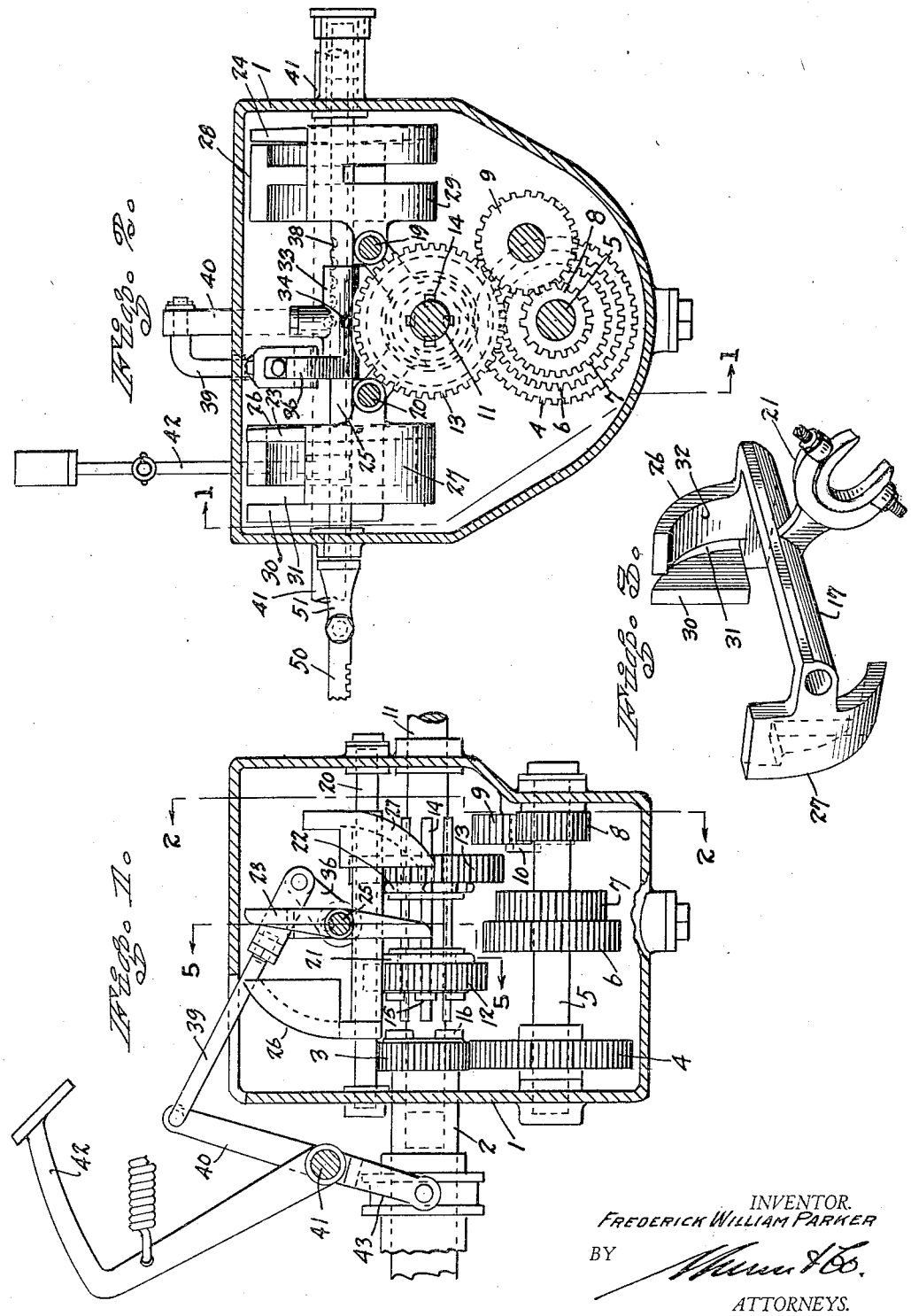

Patented May 5, 1931

1,804,109

UNITED STATES PATENT OFFICE

FREDERICK WILLIAM PARKER, OF GERLACH, NEVADA

SAFETY GEAR SHIFT

Application filed September 22, 1930. Serial No. 483,644.

The present invention relates to improvements in gear-shifting devices and has particular reference to the gear shift of a motor vehicle.

The principal object of the invention is to provide a means for making the control of the change-speed gear transmission simpler and safer.

It is particularly proposed in the present invention to provide a control mechanism for the transmission that may be operated by manipulation of a small lever associated with the steering wheel. It is further proposed to arrange the control means in such a manner that the actual setting of the mechanism for effecting a desired change may be done while the transmission is in action and before the actual change is made.

It is further proposed in the present invention to combine the actual shifting of the gear with the operation of the clutch mechanism, so that the actual shifting is done by the operation of the clutch pedal which disconnects the transmission from the power plant.

In other words, it is proposed to provide a mechanism that allows the driver of a vehicle travelling at high speed to set an operating member, such as a small hand lever provided on top of the steering wheel, for intermediate speed and to effect the change to intermediate speed by the depression of the clutch pedal.

Further objects and advantages of my invention will appear as the specification proceeds.

The preferred form of my invention is illustrated in the accompanying drawings, in which Figure 1 shows a longitudinal section through a transmission having my device incorporated therein;

Figure 2, a transverse section taken along line 2—2 of Figure 1;

Figure 3, a perspective detail view of a shifting member;

Figure 4, a top plan view of the mechanism, the top of the casing being broken away to disclose the interior;

Figure 5, a fragmentary detail view taken along line 5—5 of Figure 1;

Figure 6, a perspective assembly view showing the control means for the change-speed gear transmission associated with the steering wheel; and Figure 7, a sectional detail view taken along line 7—7 of Figure 5.

While I have shown only the preferred form of the invention, I wish to have it understood that various changes or modifications may be made within the scope of the claims hereto attached without departing from the spirit of the invention.

Referring to the drawings in detail, Figure 1 shows a conventional change-speed gear transmission, including a transmission case 1 having a drive shaft 2 extending therethrough with a gear wheel 3 fixed on the drive shaft and meshing with a gear wheel 4 on the jack shaft 5 secured in the transmission case in parallel relation to the main shaft 2. The jack shaft 5 has three further gear wheels, 6, 7 and 8 fastened thereon and a reversing gear 9 is provided on a small stub shaft, indicated at 10. A further shaft 11 is supported in the transmission casing in alinement with the drive shaft 2 and has two gear wheels 12 and 13 slidable thereon, these two gear wheels being held against revolving motion on the shaft by means of suitable keys 14. The gear wheel 12 has jaw members 15 extending therefrom adapted for engagement with jaws 16 extending from the gear wheel 3 for effecting a direct drive.

In operation, the gear wheel 3 is always in mesh with the gear wheel 4 so as to cause the shaft 5 to revolve at all times. For low speed, the gear 13 is shifted to mesh with the gear 7; for intermediate speed, the gear 12 is made to mesh with gear 6; for high speed, the gear 12 is coupled to the gear 3 for effecting a direct drive, and for reverse, the gear 13 is meshed with the gear 9.

The construction thus far described is conventional and no novelty is claimed for the same.

My invention resides in the means for shifting the gears 12 and 13, which, broadly speaking, comprise two shifters 17 and 18 slidably mounted on longitudinal shafts 19 and 20 and connected to the two gear wheels 12 and 13 by forks 21 and 22 respectively, which latter may be made adjustable as shown in Figure 3. These two shifters are operated by means of two cams 23 and 24 mounted on a transverse shaft 25 supported with freedom of sliding motion in the side walls of the transmission case. The two cam 23 and 24 consist of two blades resembling somewhat the blades of an airplane propeller, and the shifters 17 and 18 are formed with lateral arms 26, 27, 28 and 29 presenting inner cam faces upon which the cams become active for pushing the shifters one way or the other, according to the position of the shaft 25. The shape of the faces in each shifter depends, of course, upon the construction of the transmission, the exact shape of the shifter 17 being shown in perspective view in Figure 3. It will be seen from this figure that in one section, the arm 26 of the shifter 17 presents a straight face 30, while in an adjacent section, an absolute blank is provided, as indicated at 31, and in the next adjacent section, a curve 32 corresponding to the radius of the cam. These three sections, straight vertical face, blank and curved are present in each of the arms and are arranged in accordance with the requirements.

In the instance selected and shown in Figure 4, the cam 24 is opposite a straight face on the arm 29 and a blank on the arm 28, so that when the shaft 25 is turned, the lower blade of the cam 24 strikes the straight face of the arm 29 and pushes the shifter to the rear, which causes the gear 13 to mesh with the reversed idler 9 for producing reverse speed. This position will be referred to as the first position.

At the same time, the cam 23 is opposite curved sections in both arms 26 and 27, which means that the shifter 17, no matter what its previous position was, will be returned to a central position and will move the gear 12 into an inactive position.

As the shaft 25 is advanced one step into the second position, both cams 23 and 24 are opposite curved sections, so as to bring both shifters into central position and to disengage both gears 12 and 13 from whatever gears they were engaged with before for bringing about the position known as neutral.

On a further advance of the shaft 25 into the third position, the cam 24 is brought opposite a straight face marked "low" of the arm 28 and a blank of the arm 29, while the cam 23 is still opposite curved faces of the arms 26 and 27. A turning movement of the shaft 25 shifts the shifter 18 forward, thereby engaging the gear 13 with the gear 7 for slow forward speed, while the shifter 17 retains or is moved into a central position by the cam 23.

On a further advance of the shaft 25 into a fourth position, the cam 24 is opposite two curved faces of the arms 28 and 29, while the cam 23 is opposite a straight face marked "intermediate" of the arm 27 and a blank of the arm 26, so that on a turning movement, the upper blade of the cam 23 pushes the shifter 17 backward for engaging the gear 12 with the gear 6 for intermediate speed, while the shifter 18 retains or is moved into a central position.

On a further advance of the shaft 25 into the fifth position, the cam 24 is again opposite two curved faces, while the cam 23 is opposite a straight face marked "high" of the arm 26 and opposite a blank at the other arm, so that on a turning movement, the shifter 17 is moved forward for engaging the jaws of gear 12 with the jaws of the gear 3 for high speed, while the shifter 18 retains or is moved into a central position.

Attention is called to the fact that the arms 26 and 28 present their cam faces above the horizontal plane of the shaft 25, so that these two arms are actuated by the upper blades, while the two arms 27 and 29 are below the plane and are operated by the lower blades of the cams 23 and 24, which allows all the shifting to be carried out by rocking motion of the shaft 25 in the same direction.

The shaft 25 supports on its central section a sleeve 33 which is held against endwise motion between the two shifters 17 and 18 and which is held against rotary motion on the shaft 25 by a set screw 34 extending into a groove 35 of the shaft 25. This sleeve has an arm 36 extending therefrom for operating the shaft 25, but apart from serving as an operating member, it also serves to yieldingly hold the shaft 25 in any one of the five positions hereinbefore described by means of a spring-pressed ball 37 entering into one of five depressions 38 in the shaft 25.

The arm 36 if the sleeve 33 is connected through a link 39 with one arm of a lever 40 mounted on a shaft 41 serving as a pivot for the clutch pedal 42, the other arm 43 of the lever being used for disengaging the clutch.

It will be seen that in this manner, when the foot pedal 42 is depressed for disengaging the clutch, the shaft 25 is turned for effecting the gear shift desired. It should be noted at this point that the blades of the cams 23 and 24 have to travel through a considerable distance before engaging with the shifter arms, so that the actual shifting is not done until after the clutch has become entirely disengaged.

The rod 25 is moved longitudinally by operation of a small handle 44 revolvable over a segment 45 mounted on top of the steering wheel and the mechanism shown in Figure 6, including a rod 46 operated by the handle 44 and connected through bevel gears 47 with a horizontal rod 48, which latter operates the shaft 25 through any suitable means, as, for instance, through a pinion 49 meshing with a rack rod 50 pivoted to the clevis 51 which engages with the end of the shaft 25 in such a manner as to allow of rocking motion of the latter. The segment 45 is marked at five different points reverse, neutral, low, intermediate and high, corresponding to the five positions of the shaft 25 previously outlined.

In operation, my arrangement is extremely simple. The engine is started with the handle 44 disposed in neutral, whereupon the handle is moved to low, which brings the cam 24 opposite the straight face of shifter arm 28. The clutch pedal is then depressed, which causes the shaft 25 to rock and causes the cam 24 to push the shifter 18 forward for engaging the gear 13 with the gear 7. Releasing of the clutch pedal now starts the vehicle, and while the vehicle advances in low, the operator moves the handle 44 to intermediate, which brings the cam 23 opposite the straight face of shifter arm 27.

As the operator again depresses the clutch pedal, the lower blade of the cam 23 pushes the shifter 17 backward for engagement of gear 12 with gear 6. Upon release of the clutch pedal, the car now advances in intermediate speed. The operator then moves the handle 44 to the last position marked "high", thereby advancing the cam 23 into a position opposite the straight face of shifter arm 26. Again depressing the clutch pedal, he rocks the arm 25 for shifting the gear 12 toward the gear 3 for direct driving connection between the shaft 2 and the shaft 11.

The advantages of my invention will be readily understood from the foregoing description.

The clutch, as has been previously pointed out, is always fully released before the gears are shifted; after the handle on top of the steering wheel has been properly set, there is no danger of any mistake in the shifting of the gear, since both gear shifters are positively actuated on each move and are firmly held in the proper position at all times.

It is not necessary for the operator to remove his hand from the steering wheel for the purpose of gear shifting, which is an important safety factor. Aside from this, it is of considerable advantage to the driver that he may select the gear before he actually uses it. When travelling over rough roads, for instance, or on hillsides where it may be necessary to suddenly change from high speed, for example, to intermediate speed, the driver may position the handle on top of his steering wheel for intermediate speed and then continue driving in high speed as long as conditions allow this speed to be used.

When a sudden change becomes necessary or desirable, he merely need depress the clutch, whereby the change is effected in the fraction of a second.

I claim:

1. A cam-operated shifter of the character described comprising a sleeve adapted for mounting with freedom of endwise motion, two arms extending from the sleeve in spaced and parallel relation, the arms having registering concave faces adapted for engagement by a centrally mounted cam for shifting the sleeve into a central position and each arm having a projecting face allowing the cam to move the sleeve into an end position, each of said projecting faces being opposed by a blank on the other arm.

2. In combination, a shaft having two cam arms extending in opposite directions, a sleeve mounted transversely relative to the shaft having two arms extending therefrom to straddle the cam arms, two registering concave faces on the sleeve arms allowing the cam arms to move the sleeve into a central position, and a projecting face on each sleeve arm allowing the cam arms to move the sleeve into opposite positions, each projecting face being opposed by a blank in the other sleeve arm.

3. In combination, a shaft having two gears movable thereon, two shafts mounted parallel to the first shaft having gear shifting devices slidable thereon, an operative connection between each gear shifting device and its gear, a transversely mounted shaft having cams thereon for moving the gear shifting devices, a sleeve on the transverse shaft mounted between the gear shifting devices so as to be held against endwise motion, means for holding the transverse shaft to the sleeve against rotary motion, means for rocking the sleeve whereby the transverse shaft is rocked, means for imparting endwise motion to the transverse shaft and means associated with the sleeve for yieldingly holding the transverse shaft in any one of a plurality of desired positions.

FREDERICK WILLIAM PARKER.